(12) United States Patent
Joo et al.

(10) Patent No.: US 8,334,944 B2
(45) Date of Patent: Dec. 18, 2012

(54) DISPLAY APPARATUS AND METHOD OF MANUFACTURING OPTICAL SHEET FOR THE SAME

(75) Inventors: Byung-Yun Joo, Seoul (KR); Jin-Sung Choi, Yongin-si (KR); Sang-Hoon Lee, Cheonan-si (KR); Min-Young Song, Seoul (KR); Dong-Kwan Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 372 days.

(21) Appl. No.: 12/410,064

(22) Filed: Mar. 24, 2009

(65) Prior Publication Data

US 2010/0073962 A1    Mar. 25, 2010

(30) Foreign Application Priority Data

Sep. 24, 2008   (KR) ............................ 10-2008-93775

(51) Int. Cl.
*G02F 1/1335*  (2006.01)
*F21V 7/04*    (2006.01)
*H01J 9/24*    (2006.01)

(52) U.S. Cl. ............................ 349/64; 362/620; 445/24
(58) Field of Classification Search .................... 349/64; 362/620; 445/24

See application file for complete search history.

(56) References Cited

U.S. PATENT DOCUMENTS

| 6,027,850 | A  | * | 2/2000 | Kawakami et al. | ........... | 430/201 |
| 2004/0066476 | A1 | * | 4/2004 | Lee et al. | ....................... | 349/112 |
| 2006/0256581 | A1 | * | 11/2006 | Hwang et al. | ................ | 362/619 |
| 2007/0242475 | A1 | * | 10/2007 | Minobe et al. | ............... | 362/608 |
| 2008/0002432 | A1 | * | 1/2008 | Ueno et al. | ..................... | 362/620 |
| 2008/0186430 | A1 | * | 8/2008 | Seo | ................................ | 349/65 |
| 2010/0002461 | A1 | * | 1/2010 | Wu et al. | ....................... | 362/558 |

FOREIGN PATENT DOCUMENTS

| KR | 10-2008-0019802 | 3/2008 |
| KR | 10-2008-0037308 | 4/2008 |
| KR | 10-0837305 | 6/2008 |

* cited by examiner

*Primary Examiner* — Jerry Blevins
(74) *Attorney, Agent, or Firm* — Innovation Counsel LLP (57) ABSTRACT

A display apparatus includes a display panel and a backlight unit for an embodiment. The display panel includes a plurality of pixels and the backlight unit supplies light to the display panel. The backlight unit includes a light source, which generates the light, and an optical sheet. The optical sheet includes a plurality of prism patterns formed on a surface of the optical sheet facing the display panel. The prism patterns include a plurality of peaks and a plurality of valleys to change the path of the light, and a plurality of diffusion patterns arranged at the peaks and valleys.

20 Claims, 11 Drawing Sheets

DISPLAY APPARATUS AND METHOD OF MANUFACTURING OPTICAL SHEET FOR THE SAME

CROSS-REFERENCE TO RELATED APPLICATIONS

This application claims the benefit of and priority to Korean Patent Application No. 2008-93775 filed on Sep. 24, 2008, the contents of which are herein incorporated by reference in their entirety.

BACKGROUND

1. Technical Field

The present invention relates generally to a display apparatus, which may have an improved display quality, and a method of manufacturing an optical sheet for the same.

2. Related Art

Liquid crystal displays (LCD) have become extensively used because of their various characteristics, such as light weight, thinness, and low power consumption. The typical LCD includes an LCD panel that has two transparent substrates and liquid crystal cells arranged between the two transparent substrates in a matrix form, a panel driver that drives the LCD panel, and a backlight unit that supplies light to the LCD panel.

The backlight unit includes a light source that emits the light, a light guide plate that guides the light from the light source to the liquid crystal display panel, and optical sheets arranged above the light guide plate. The optical sheets generally include a diffusion sheet, a prism sheet, and a protective sheet. The prism sheet includes a prism pattern of which peaks and valleys are alternately disposed. Thus, a moiré phenomenon occurs due to interference of periodic patterns between pitches of the peaks and pitches of pixels of the LCD panel.

SUMMARY

One embodiment of the present invention provides a display apparatus, which may have an improved display quality. Another embodiment of the present invention provides a method of manufacturing an optical sheet for the display apparatus.

In an embodiment of the present invention, a display apparatus includes a display panel including a plurality of gate lines, a plurality of data lines crossing the gate lines, a plurality of pixels defined by the gate lines and the data lines, and a backlight unit disposed at a rear portion of the display panel to supply light to the display panel. The backlight unit includes a light source generating the light and an optical sheet. The optical sheet includes a plurality of prism patterns having a plurality of peaks and a plurality of valleys, the prism patterns being formed on a first surface of the optical sheet facing the display panel, and a plurality of diffusion patterns arranged at the peaks and valleys, and which overlap the pixels at a predetermined interval.

Each of the pixels includes a red sub-pixel, a green sub-pixel, and a blue sub-pixel, and the red, green, and blue sub-pixels extend in a first direction and are arranged along a second direction substantially perpendicular to the first direction. The prism patterns are arranged inclined with respect to the gate lines or the data lines at a predetermined angle of about 23 degrees to about 30 degrees. As a specific example, the angle of inclination of the prism patterns with respect to the gate lines is about 28 degrees.

Each of the diffusion patterns is spaced apart from adjacent peaks thereto or adjacent valleys thereto by an interval of $$\frac{P}{2\cos\theta},$$

where P denotes a pitch of the prism patterns and θ denotes the angle of inclination, which is not equal to 90 degrees and is not equal to 270 degrees. Each of the diffusion patterns, which is arranged along a same peak of the peaks or a same valley of the valleys, is spaced apart from an adjacent diffusion pattern thereto by an interval of $$\frac{X}{\cos\theta},$$

wherein X denotes a distance between two lines that extend in the first direction to respectively bisect two adjacent sub-pixels, and θ denotes the angle of inclination, which is not equal to 90 degrees and is not equal to 270 degrees. Each of the red, green and blue sub-pixels overlaps at least one diffusion pattern of the diffusion patterns arranged at the valley and at least one diffusion pattern of the diffusion patterns arranged at the peak.

In another embodiment of the present invention, a method of manufacturing an optical sheet is provided as follows. A base sheet is prepared with a roller applied to a first surface of the base sheet. The roller includes pressurization portions and decompression portions each of which extend in an axial direction of the roller, with recesses arranged along the pressurization portions and the decompression portions in a predetermined interval. The first surface is pressed by the roller. Then, the base sheet is cured. The recesses of the roller may be formed by using a laser. The base sheet may be cured by ultraviolet rays. In addition, a reflection pattern may further be formed on a second surface opposite to the first surface.

According to the above, the diffusion patterns of the optical sheet overlap the pixels of the display panel to change the brightness of the light, so that the periodicity of the brightness pattern is weakened and the moiré may be reduced. In addition, the base sheet is pressed by the roller on which are the recesses to form the diffusion patterns, so that the diffusion pattern may be easily formed.

BRIEF DESCRIPTION OF THE DRAWINGS

The above and other advantages of embodiments of the present invention will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Figure 1:
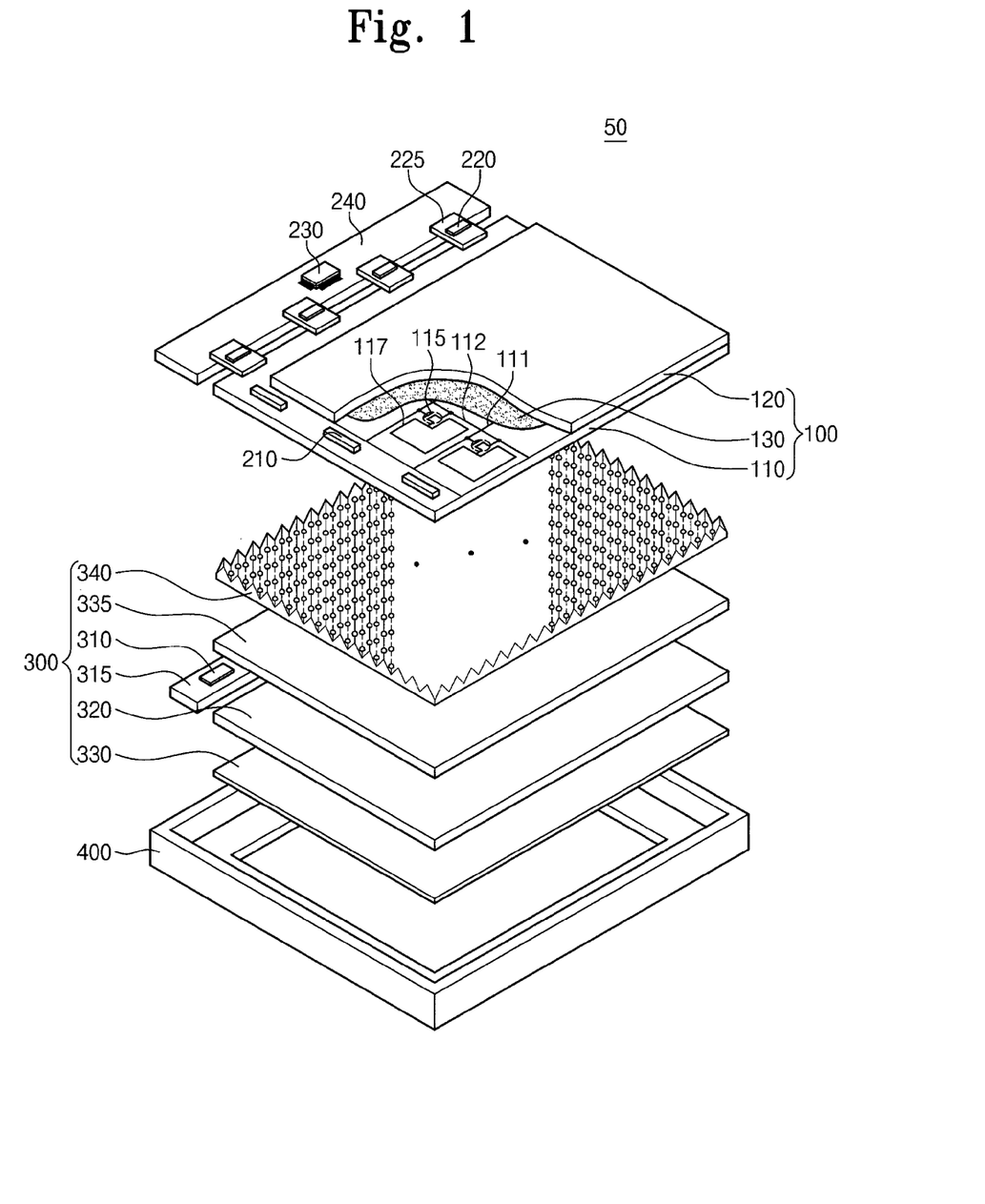
FIG. 1 is an exploded perspective view showing a display apparatus according to an embodiment of the present invention.
Figure 2:
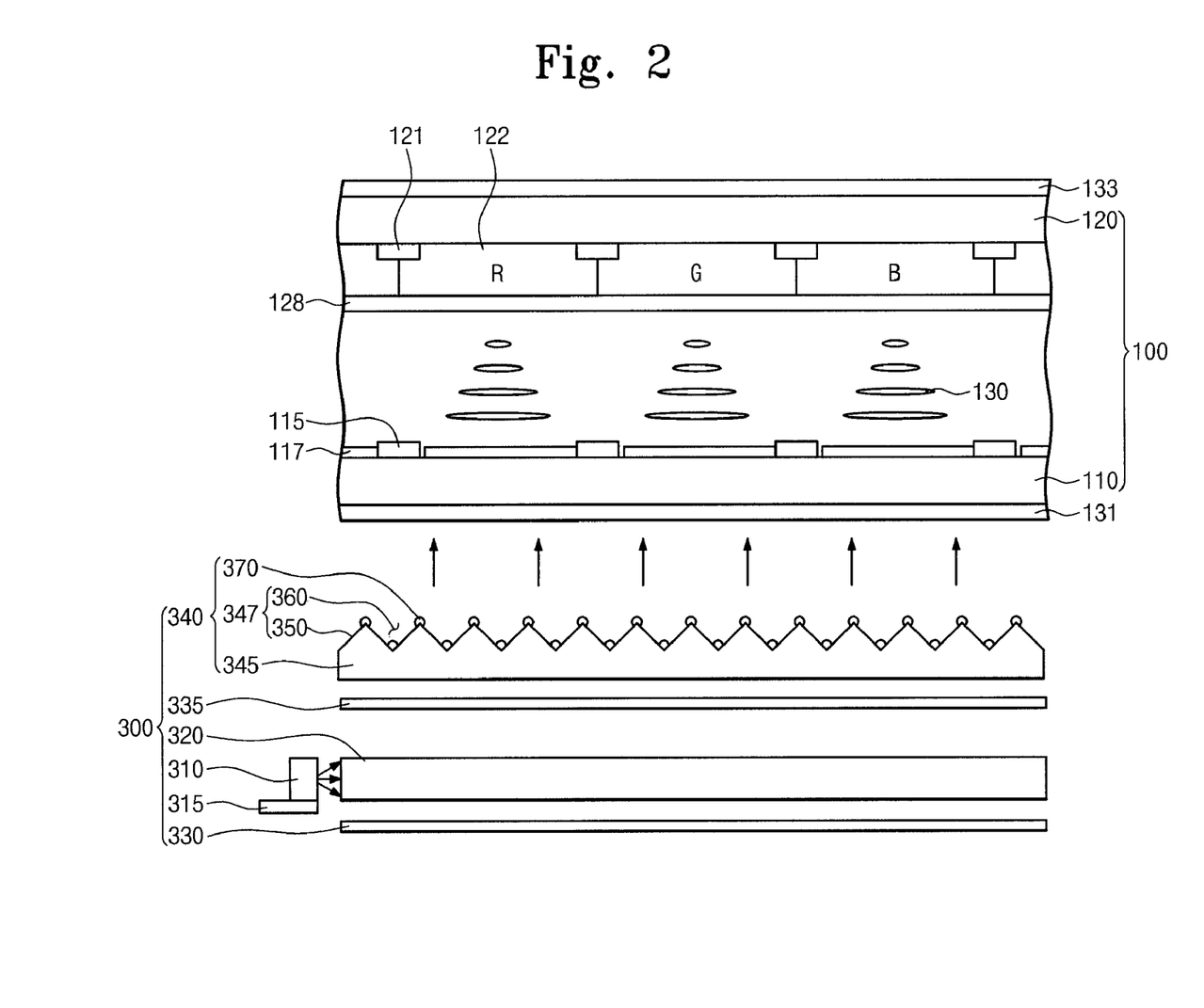
FIG. 2 is a sectional view showing a display panel and a backlight unit of FIG. 1 according to an embodiment of the present invention.

FIG. 1 is an exploded perspective view showing a display apparatus and FIG. 2 is a sectional view showing a display panel and a backlight unit of FIG. 1 in accordance with one or more embodiments of the present invention.

Referring to FIGS. 1 and 2, a display apparatus 50 includes a display panel 100 that displays images, a gate driver 210 and a data driver 220 that drive the display panel 100, a backlight unit 300 that supplies light to the display panel 100, and a mold frame 400 that receives the display panel 100 and the backlight unit 300 therein.

The display panel 100 includes a thin film transistor substrate 110, a color filter substrate 120, and a liquid crystal 130 interposed between the thin film transistor substrate 110 and the color filter substrate 120.

The thin film transistor substrate 110 includes a plurality of gate lines 111 extending in a direction, a plurality of data lines 112 extending in a direction substantially perpendicular to the gate lines 111, a plurality of thin film transistors 115 each of which is connected to a corresponding gate line and a corresponding data line, and a plurality of pixel electrodes 117 connected to the thin film transistors 115, respectively.

The color filter substrate 120 includes a black matrix 121 that covers areas in which images are not displayed, color filters 122 that display red, green, and blue colors, and a common electrode 128 that forms an electric field together with the pixel electrodes 117.

The liquid crystal 130 has dielectric anisotropy and is aligned between the thin film transistor substrate 110 and the color filter substrate 120. The liquid crystal 130 adjusts the transmittance of light supplied from the backlight unit 300.

The thin film transistor substrate 110 and the color filter substrate 120 are coupled with a first polarizing film 131 and a second polarizing film 133, respectively. The first polarizing film 131 and the second polarizing film 133 polarize light incident thereto. In the present embodiment, at least one of the first and second polarizing films 131 and 133 may be formed with an anti-glare layer (not shown).

The gate driver 210 is formed on the thin film transistor substrate 110 by a chip-on-glass scheme. The gate driver 210 applies a gate on/off signal to the gate lines 111.

The data driver 220 is mounted on a signal transmission film 225 by a tape carrier package scheme. The data driver 220 is electrically connected to the thin film transistor substrate 110 and a driving circuit board 240 through the signal transmission film 225. The data driver 220 applies pixel data to the transistors 115 connected to the data lines 112.

The driving circuit board 240 includes a printed circuit board on which a plurality of signal transmission lines is formed. Various electric parts and a timing controller 230 are mounted on the driving circuit substrate 240. The timing controller 230 receives external power source voltage and various signals and applies control signals to the gate and data drivers 210 and 220 and the pixel data to the data driver 220 to display images. In addition, the driving circuit substrate 240 supplies the power source voltage to the gate driver 210 and the data driver 220 through the signal transmission film 225.

The backlight unit 300 is disposed under the display panel 100 to supply light to the display panel 100. To this end, the backlight unit 300 includes a light source 310, a light guide plate 320, a reflection sheet 330, a diffusion sheet 335, and an optical sheet 340.

The light source 310 generates light and supplies the light to the display panel 100. The light source 310 may include light emitting diodes or lamps. In the present embodiment, in order to reduce the thickness of the display apparatus 50, the light source 310 includes light emitting diodes. The light source 310 is mounted on a light source substrate 315 and disposed adjacent to a side portion of the light guide plate 320, so that the light source 310 may supply the light to the light guide plate 320.

The light source substrate 315 may be a flexible printed circuit board. The light source substrate 315 may be electrically connected to a power source device (not shown) to apply the power source voltage to the light source 310. The light source substrate 315 may be accommodated in the mold frame 400.

The light guide plate 320 is disposed such that a side portion thereof is adjacent to the light source 310, and changes paths of the light incident through the side portion from the light source 310 to allow the light to travel to the display panel 100. The light guide plate 320 may include acrylic material and may have a dot pattern or a V-shape pattern to reflect the light.

The reflection sheet 330 is disposed under the light guide plate 320 and reflects the light leaked downward from the light guide plate 320 to the display panel 100.

The diffusion sheet 335 is disposed on the light guide plate 320 and diffuses the light exiting from the light guide plate 320 such that the diffused light has a uniform incidence into the display panel 100.

The optical sheet 340 is disposed on the diffusion sheet 335. The optical sheet 340 includes a base sheet 345, which includes a transparent polymer material, and a plurality of prism patterns arranged on a surface of the base sheet 345. The prism patterns 347 change the paths of the light incident thereto, so that the light travels toward the display panel 100 in the vertical direction with respect to the display panel 100. In addition, the prism patterns 347 include peaks 350 defined by two adjacent surfaces inclined against the base sheet 345 and valleys 360 defined by two adjacent peaks 350, the peaks 350 and the valleys 360 being alternately disposed. The optical sheet 340 includes diffusion patterns 370 arranged on the prism patterns 347 and spaced apart from each other. If the diffusion patterns 370 are arranged on the peaks 350, the diffusion patterns 370 reduce the collecting efficiency of the prism patterns 347, and if the diffusion patterns 370 are arranged on the valleys 360, the diffusion patterns 370 improve the collecting efficiency of the prism patterns 347. The collecting efficiency of the optical sheet 340 varies by the diffusion patterns 370, thereby reducing a moiré phenomenon (or moiré effect). If the diffusion patterns 370 are not formed on the optical sheet 340, the optical sheet 340 may be spaced apart from the display panel 100 in order to reduce the moiré phenomenon. On the other hand, the optical sheet 340 including the diffusion patterns 370 may reduce the moiré without any influence from the distance between the optical sheet 340 and the display panel 100, so that the display panel 100 may be slim.

In order to supply the light to the display panel 100, the backlight unit 300 may be placed adjacent to a side face of the display panel 100 (e.g., edge illumination type) or placed under the display panel 100 (e.g., direct illumination type). In addition, the backlight unit 300 may further include a protection sheet (not shown) disposed on the optical sheet 340 to protect the optical sheet 340.

The mold frame 400 includes an insulating material such as plastic. The mold frame 400 accommodates the display panel 100 and the backlight unit 300 therein to protect the display panel 100 and the backlight unit 300 from external impacts.

Figure 3:
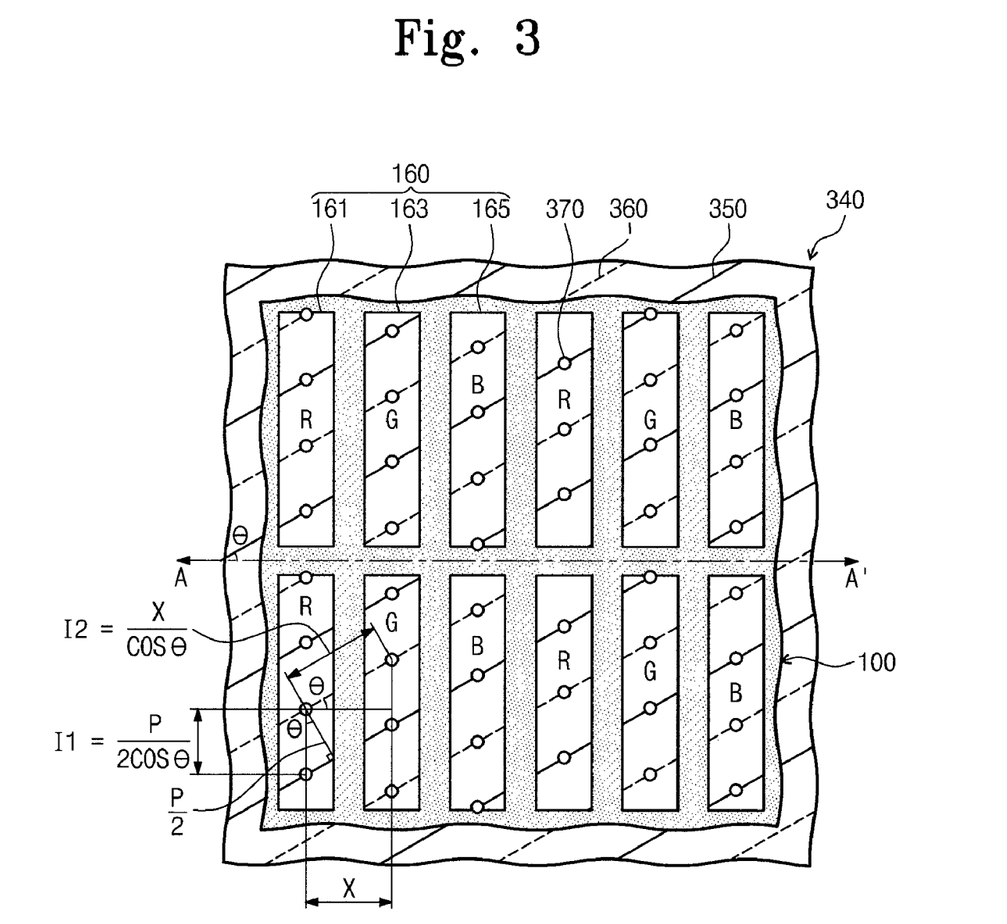
FIG. 3 is a plan view showing an optical sheet with a display panel according to an embodiment of the present invention.
Figure 4A:
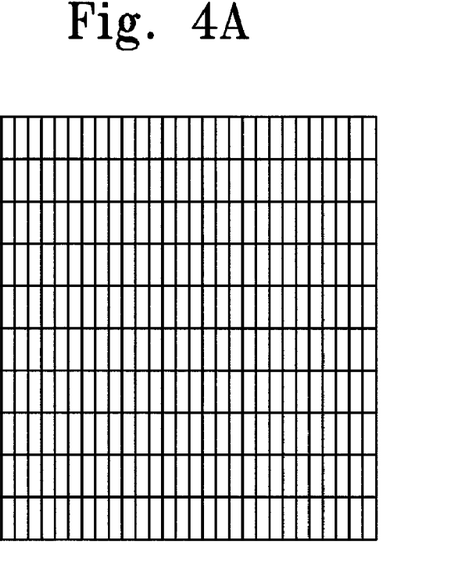
FIGS. 4A to 4D are views showing image inspection patterns used to inspect image quality of the display apparatus of FIG. 1 according to an embodiment of the present invention.
Figure 4B:
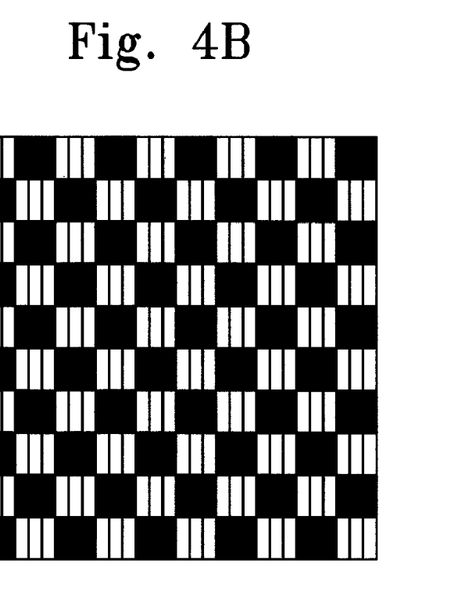
Figure 4C:
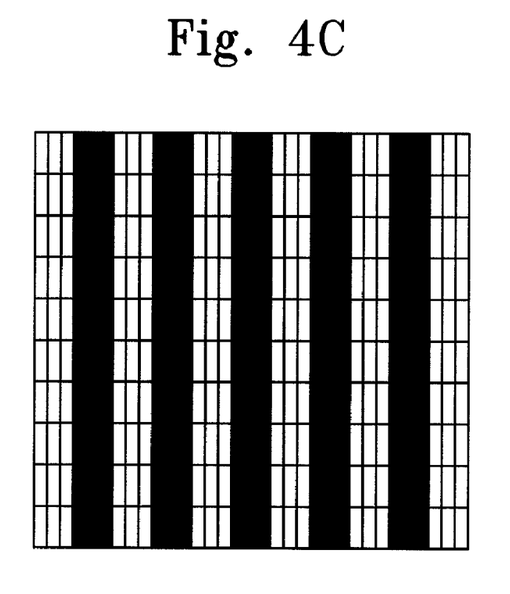
Figure 4D:
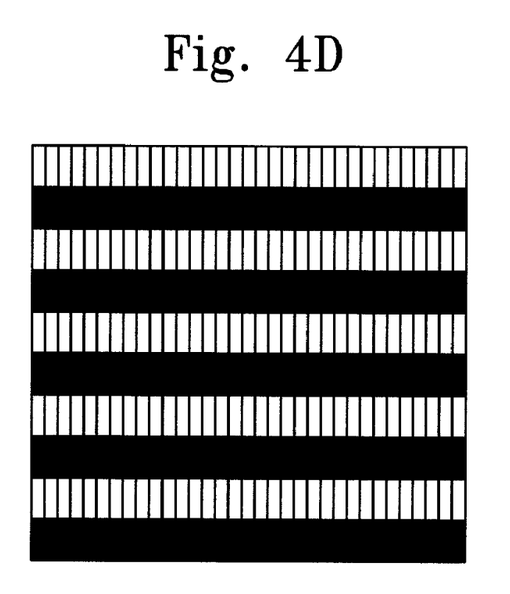

FIG. 3 is a plan view showing an embodiment of an optical sheet 340 with a display panel 100.

Referring to FIG. 3, the display panel 100 includes a plurality of pixels 160. Each of the pixels 160 has a substantially rectangular shape of which one side has a length of about 250 micrometers to about 300 micrometers. More particularly, the one side of each pixel 160 may have a length of about 283.5 micrometers. Each of the pixels 160 includes three sub-pixels 161, 163, and 165 corresponding to red, green, and blue colors, respectively. For example, each of the pixels 160 may include a red sub-pixel 161, a green sub-pixel 163, and a blue sub-pixel 165. The sub-pixels 161, 163, and 165 extend in a first direction in which a data line (not shown) of the display panel 100 extends and are arranged along a second direction substantially perpendicular to the first direction.

Referring to FIGS. 2 and 3, the optical sheet 340 includes the prism patterns 347 arranged on its surface facing the display panel 100. The prism patterns 347 have a pitch P of about 100 micrometers to about 300 micrometers. The pitch P is defined by a distance between two adjacent peaks 350. If the pitch P is about 100 micrometers or below, the collection efficiency is lowered, and if the pitch P is about 300 micrometers or above, the light supplied to the pixels 160 has a non-uniform brightness distribution since the pitch P exceeds the size of the pixels 160.

The optical sheet 340 is disposed under the display panel 100 and arranged such that the prism patterns 347 are inclined with respect to the sub-pixels 161, 163, and 165 at a predetermined angle θ (also referred to as "angle of inclination"). As shown in FIG. 3, since the prism patterns 347 are arranged inclined at angle θ with respect to a reference line A-A' extending in the second direction, in which the gate line extends, the moiré effect caused by interference between the arrangement period of the sub-pixels 161, 163, and 165 and the pitch P of the prism patterns 347 may be prevented. Although not shown in FIG. 3, the reference line A-A' may be chosen to extend in the first direction, in which the data line extends. Therefore, the prism patterns 347 may be arranged inclined with the gate and data lines of the display panel 100 at a predetermined angle. In the present embodiment, a structure for which the reference line A-A' extends in the second direction and the prism patterns 347 are arranged inclined with respect to the reference line A-A' at the angle θ will be described as an example.

The moiré effect may be caused by periodicity of the light incident into the sub-pixels 161, 163, and 165 after passing through the prism patterns 347. In detail, the sub-pixels 161, 163, and 165 include a line-shaped bright area caused by the light that has passed through the peaks 350 and a line-shaped dark area caused by the light that has passed through the valleys 360. The dark area has a brightness lower than that of the bright area. When the bright area and the dark area are alternately arranged in the sub-pixels 161, 163, and 165 that are regularly arranged, a wave pattern may be visible due to the periodicity. If the pitch P of the prism patterns 347 exactly matches with the arrangement period of the pixels 160, the moiré pattern may not occur. This is difficult, however, to realize. In order to avoid such moiré effects due to periodicity, the prism patterns 347 are arranged inclined with respect to the sub-pixels 161, 163, and 165.

The prism patterns 347 are inclined with respect to the reference line A-A' at the angle of about 23 degrees to about 30 degrees. More particularly, the prism patterns 347 are inclined with respect to the reference line A-A' at an angle of about 28 degrees. In the examples where the prism patterns 347 are inclined with respect to the reference line A-A' at an angle less than 22 degrees or more than 31 degrees, the moiré effect increases.

Each of the sub-pixels 161, 163, and 165 includes at least one bright area and at least one dark area since each peak 350 and each valley 360 overlap at least one sub-pixel of the sub-pixels 161, 163, and 165. Thus, the diffusion patterns 370 are arranged overlapped with the sub-pixels 161, 163, and 165 to weaken the periodicity by varying the brightness of the bright and dark areas.

The diffusion patterns 370 are arranged on the prism patterns 347 overlapping the sub-pixels 161, 163, and 165 in a predetermined interval (e.g., I1 seen in FIG. 3). For instance, the diffusion patterns 370 may be arranged on the peaks 350 and the valleys 360 overlapping a center line that extends in a longitudinal direction of each of the sub-pixels 161, 163, and 165 such that the center line bisects each of the sub-pixels 161, 163, and 165. The diffusion patterns 370 are protruded toward the display panel 100 to allow each diffusion pattern to have a shape defining a portion of a spherical shape or a portion of an oval shape when viewed in a sectional view taken along a direction orthogonal to a direction in which the peaks 350 and the valleys 360 extend. Each of the diffusion patterns 370 has a diameter of about 5 micrometers to about 50 micrometers. In the present embodiment, the position of the diffusion patterns 370 is not limited to the area overlapping the center line, and the diffusion patterns 370 may be arranged on the peaks 350 and the valleys 360 overlapping the sub-pixels 161, 163, and 165.

The diffusion patterns 370 may be arranged on the peaks 350 and the valleys 360 according to the predetermined interval (I1). In detail, the interval (I1), between the diffusion patterns 370 arranged on one peak of the peaks 350 and one valley of the valleys 360 adjacent to the one peak and extending in the first (data line) direction (or longitudinal direction of the sub-pixels), is determined by Equation 1 as follows.

$$I1 = \frac{P}{2\cos\theta} \quad \text{Equation 1}$$

In Equation 1, I1 denotes the interval between the diffusion patterns 370 arranged on one peak of the peaks 350 and one valley of the valleys 360 adjacent to the one peak, P denotes the pitch of the prism patterns 347, and θ denotes the angle of inclination (θ is not equal to 90 degrees or 270 degrees). Each of the sub-pixels 161, 163, and 165 overlaps at least two diffusion patterns 370.

In addition, the diffusion patterns 370 may be arranged on the same peak of the peaks 350 of the prism patterns 347 in a predetermined interval (I2). This interval (I2), between the diffusion patterns 370, is determined by Equation 2 according to an interval (X) between the center lines of two adjacent sub-pixels—for instance, a red sub-pixel 161 and a green sub-pixel 163—as follows.

$$I2 = \frac{X}{\cos\theta} \quad \text{Equation 2}$$

In Equation 2, I2 denotes the interval between the diffusion patterns 370 arranged on the same peak, X denotes the interval between two adjacent center lines, and θ denotes the angle of inclination (θ is not equal to 90 degrees or 270 degrees).

FIGS. 4A to 4D are views showing image inspection patterns used to inspect image quality of the display apparatus of FIG. 1, and FIGS. 5A to 5D are views showing display panels displaying images according to the image inspection patterns of FIGS. 4A to 4D, respectively, in accordance with one or more embodiments.

As shown in FIGS. 4A to 4D, various image quality inspection patterns have been applied to the display panel since the moiré phenomenon decreases as a whole in the display apparatus employing the optical sheet. As a result, the moiré interference has been reduced.

FIGS. 4A, 4B, 4C, and 4D show a white pattern, a dot pattern, a vertical line pattern, and a horizontal line pattern. When the image quality inspection pattern is provided, the display panel displays an image using pixels including red, green, and blue sub-pixels.

In the display panel, one side of each pixel has a length of about 283.5 micrometers. In addition, the optical sheet includes the prism patterns having a pitch of about 169 micrometers and the prism patterns are arranged inclined with respect to the sub-pixels at an angle of about 28 degrees. The diffusion patterns are arranged on the prism patterns.

Figure 5A:
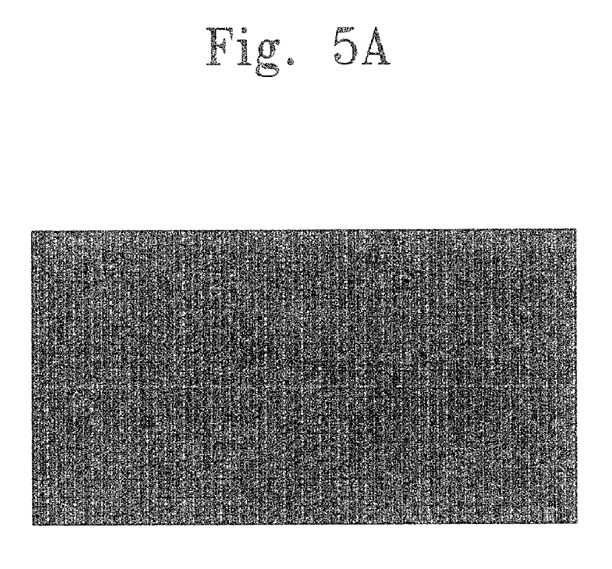
FIGS. 5A to 5D are views showing display panels displaying images according to the image inspection patterns of FIGS. 4A to 4D, respectively, according to an embodiment of the present invention.
Figure 5B:
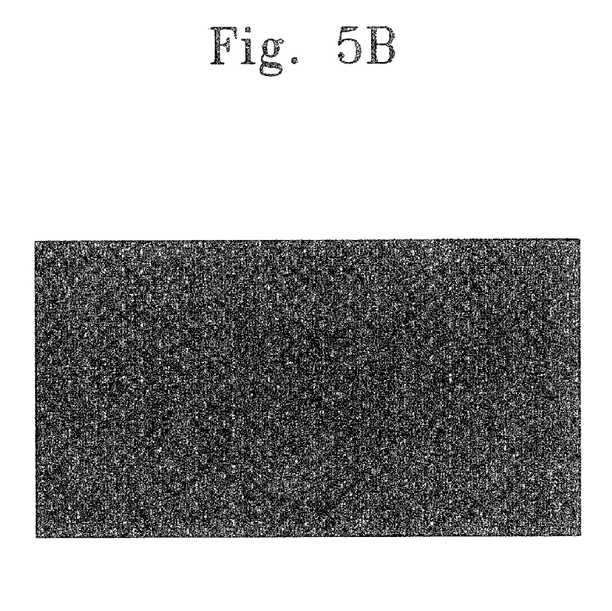
Figure 5C:
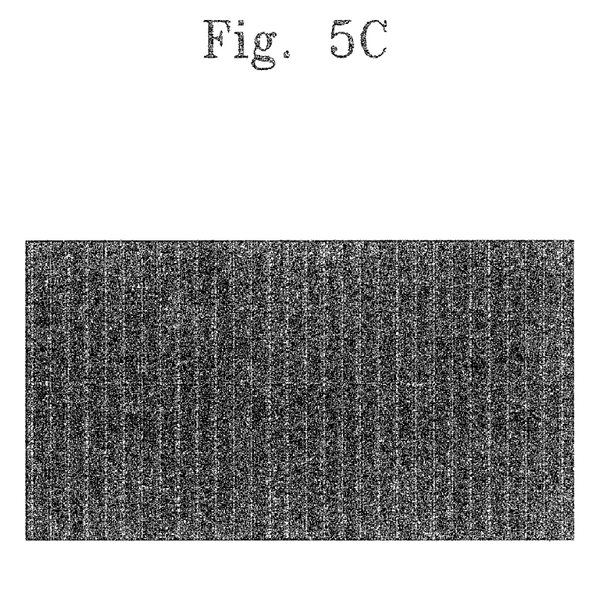
Figure 5D:
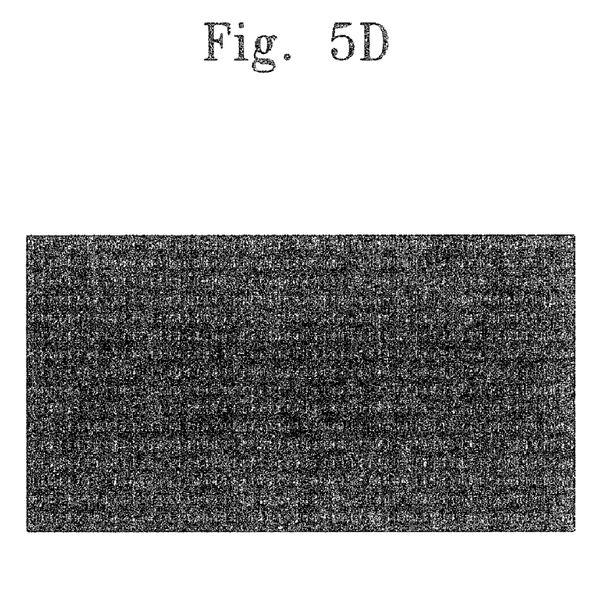

FIG. 5A shows the display panel that displays the image to which the white pattern is applied and FIG. 5B shows the display panel that displays the image to which the dot pattern is applied. FIG. 5C shows the display panel that displays the image to which the vertical line pattern is applied and FIG. 5D shows the display panel that displays the image to which the horizontal line pattern is applied.

As shown in FIG. 5A to 5D, the optical sheet on which the pattern patterns are arranged weakens the periodicity of the brightness, which is periodically changed in the display panel, thereby decreasing the moiré effect.

Figure 6:
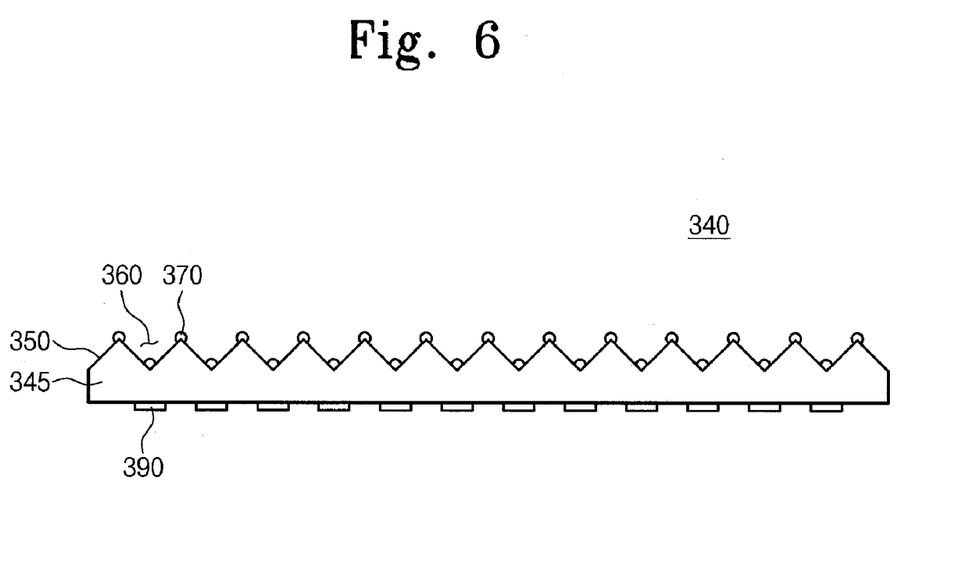
FIG. 6 is a sectional view showing an optical sheet of FIG. 1 according to another embodiment of the present invention.

FIG. 6 is a sectional view showing another embodiment of an optical sheet of FIG. 1. In FIG. 6, the same reference numerals denote the same elements in FIG. 2, and thus detailed description of the same elements will be omitted.

Referring to FIG. 6, an optical sheet 340 includes a base sheet 345, peaks 350 and valleys 360 formed on a first surface of the base sheet 345, diffusion patterns 370 arranged on the peaks 350 and valleys 360, and reflection patterns 390 arranged on a second surface of the base sheet 345, which faces the first surface.

The reflection patterns 390 may be attached onto the base sheet 345 by using adhesive or a pressure-sensitive adhesive. The reflection patterns 390 include a material that reflects the light, such as titanium oxide (TiOx) deposited on acrylate resin.

The reflection patterns 390 reflect the light incident through the valleys 360 to introduce the light to be re-incident into the peaks 350, so that the brightness of the light exiting from the optical sheet 340 may be improved.

FIGS. 7A, 7B, 8, and 9 are views illustrating a method of manufacturing an optical sheet of FIG. 1, in accordance with one or more embodiments.

Figure 7A:
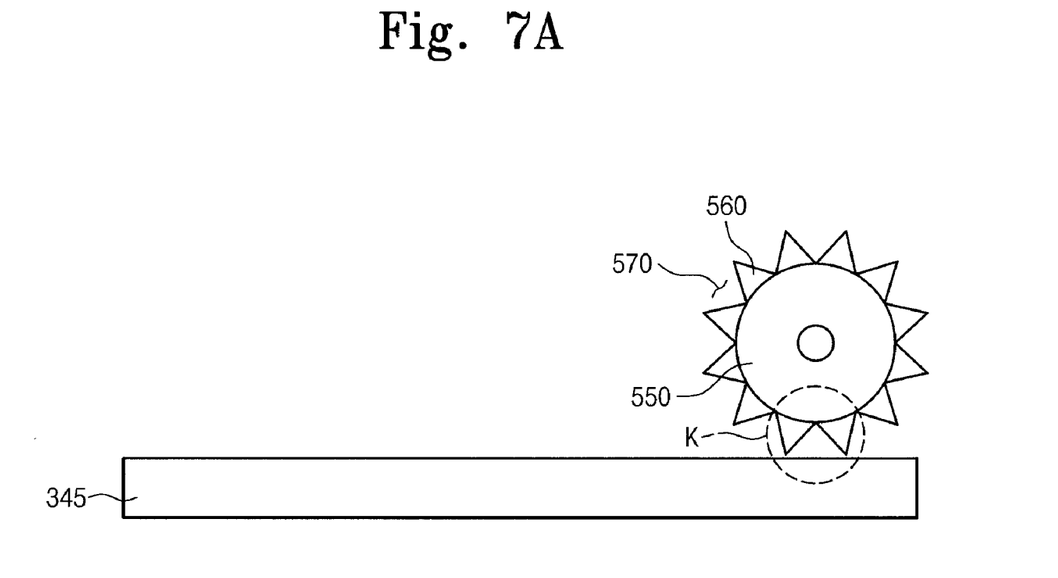
FIGS. 7A, 7B, 8, and 9 are views illustrating a method of manufacturing an optical sheet of FIG. 1 according to an embodiment of the present invention.
Figure 7B:
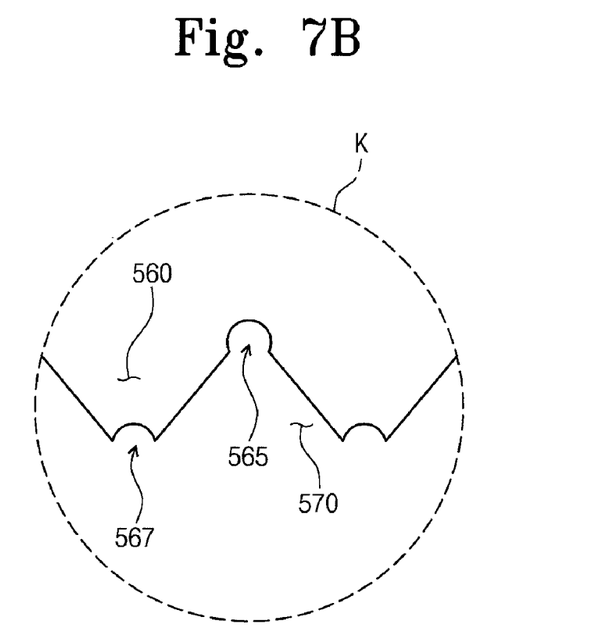

Referring to FIG. 7A, first, a transparent polymer material is pressed out to form a thin base sheet 345.

Then, a roller 550 is applied to the base sheet 345. The roller 550 includes a metallic material, and the roller 550 includes a pressurization portion 560 and a decompression portion 570 formed on an outer surface of the roller 550. In addition, first recesses 567 (see FIG. 7B) are formed at the pressurization portion 560 and second recesses 565 are formed at the decompression portion 570. The first recesses 567 and the second recesses 565 may be formed by processing portions of the roller 550 using a laser. Moreover, descriptions of intervals between the first recesses 567 and intervals between the second recesses 565 refer to the descriptions of the diffusion patterns in FIG. 3.

Figure 8:
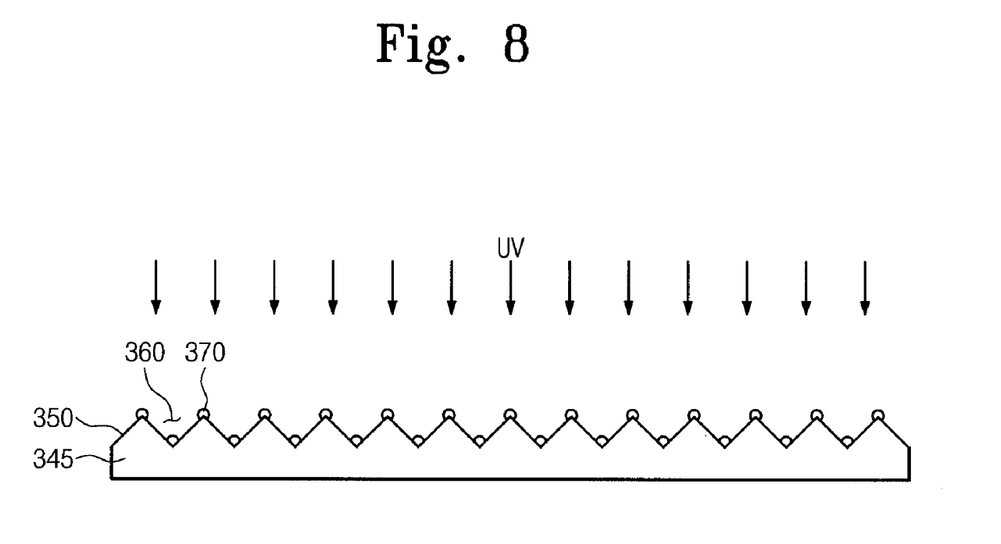

Roller 550 may be applied so that the base sheet 345 is pressurized by the roller 550, so that the peaks 350, the valleys 360, and the diffusion patterns 370 formed at the peaks 350 and the valleys 360 are formed as shown in FIG. 8. The peaks 350 are formed by the decompression portion 570 and the valleys 360 are formed by the pressurization portion 560.

The diffusion patterns 370 are outwardly protruded from the base sheet 345 by the first recesses 567 and the second recesses 565. The diffusion patterns 370 each may have a shape defining a portion of a spherical shape or a portion of an oval shape when viewed in a sectional view taken along a direction orthogonal to a direction in which the peaks 350 and the valleys 360 extend.

Figure 9:
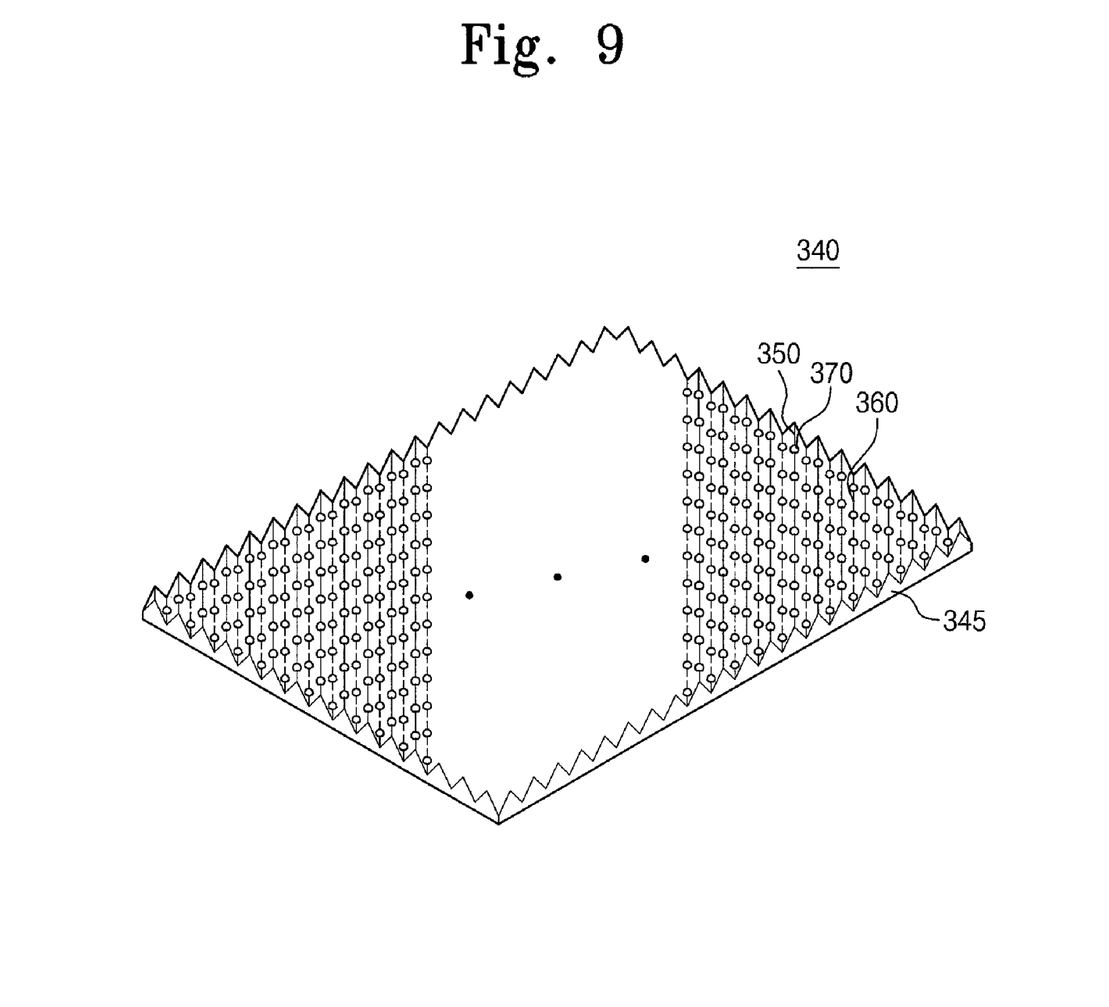

Referring to FIGS. 8 and 9, the base sheet 345, the peaks 350, the valleys 360, and the diffusion patterns 370 are irradiated by ultraviolet rays and cured, thereby forming the optical sheet 340. Descriptions of intervals between the peaks 350 and between adjacent peaks and valleys refer to the descriptions of the diffusion patterns in FIG. 3.

The reflection patterns 390 including titanium oxide (TiOx) and acrylate resin are attached to the base sheet 345 by using an adhesive or a pressure sensitive adhesive. According to the above, the diffusion patterns of the optical sheet overlap the pixels of the display panel to change the brightness of the light, so that the periodicity of the brightness pattern is weakened and the moiré patterns may be reduced.

In addition, the base sheet is pressed by the roller on which are the recesses to form the diffusion patterns, so that the diffusion patterns may be easily formed.

Although exemplary embodiments of the present invention have been described, it is understood that the present invention should not be limited to these embodiments but various changes and modifications can be made by one of ordinary skill in the art within the spirit and scope of the present invention as hereinafter claimed.

What is claimed is:

1. A display apparatus comprising:
a display panel including a plurality of gate lines, a plurality of data lines crossing the gate lines in a plan view of the display apparatus, and a plurality of pixels defined by the gate lines and the data lines; and
a backlight unit disposed at a rear portion of the display panel to supply light to the display panel,
wherein the backlight unit comprises:
a light source generating the light; and
an optical sheet including:
a plurality of prism patterns having a plurality of peaks and a plurality of valleys, which are formed on a first surface of the optical sheet facing the display panel,
a first plurality of diffusion patterns disposed at the plurality of peaks, and
a second plurality of diffusion patterns disposed at the plurality of valleys,
wherein the first plurality of diffusion patterns and the second plurality of diffusion patterns overlap the plurality of pixels, and
wherein the first plurality of diffusion patterns is disposed closer to the display panel than the second plurality of diffusion patterns.

2. The display apparatus of claim 1, wherein each of the pixels comprises a red sub-pixel, a green sub-pixel, and a blue sub-pixel, and the red, green, and blue sub-pixels extend in a first direction and are arranged along a second direction substantially perpendicular to the first direction.

3. The display apparatus of claim 2, wherein each of the red, green, and blue sub-pixels overlaps at least one diffusion pattern of the first plurality of diffusion patterns and at least one diffusion pattern of the second plurality of diffusion patterns.

4. The display apparatus of claim 1, wherein the prism patterns are arranged at a predetermined angle of inclination with respect to at least one of the plurality of the gate lines and the plurality of data lines.

5. The display apparatus of claim 4, wherein the angle of inclination with respect to the plurality of gate lines is from about 23 degrees to about 30 degrees.

6. The display apparatus of claim 5, wherein the angle of inclination with respect to the plurality of gate lines is about 28 degrees.

7. The display apparatus of claim 4, wherein
the first plurality of diffusion patterns and the second plurality of diffusion patterns form a set of diffusion patterns, and
each diffusion pattern of the set of diffusion patterns is spaced apart from an adjacent diffusion pattern of the set of diffusion patterns by an interval of $P/(2 \cos \theta)$, P denoting a pitch of the plurality of prism patterns, $\theta$ denoting the angle of inclination, $\theta$ being not equal to 90 degrees and not equal to 270 degrees.

8. The display apparatus of claim 4, wherein
the plurality of pixels includes a plurality of sub-pixels;
each diffusion pattern of the first plurality of diffusion patterns is spaced apart from an adjacent diffusion pattern of the first plurality of diffusion patterns by an interval of $X/\cos \theta$, X denoting a distance between two centerlines of two adjacent sub-pixels of the plurality of sub-pixels, $\theta$ denoting the angle of inclination, $\theta$ being not equal to 90 degrees and not equal to 270 degrees.

9. The display apparatus of claim 1, wherein each diffusion pattern of the first plurality of diffusion patterns has a diameter of about 5 micrometers to about 50 micrometers.

10. The display apparatus of claim 9, wherein the prism patterns have a pitch of about 100 micrometers to about 300 micrometers.

11. The display apparatus of claim 1, wherein
the first plurality of diffusion patterns and the second plurality of diffusion patterns form a set of diffusion patterns, and
each diffusion pattern of the set of diffusion patterns protrudes toward the display panel and has a shape defining a portion of a spherical shape or a portion of an oval shape when viewed in a cross-sectional view taken along a direction orthogonal to a direction in which the plurality of peaks and the plurality of valleys extend.

12. The display apparatus of claim 1, further comprising a light guide plate disposed adjacent to the light source and adapted to guide the light from the light source to the optical sheet.

13. The display apparatus of claim 1, wherein the optical sheet further comprises a reflection pattern disposed on a second surface facing the first surface to reflect the light.

14. A method of manufacturing an optical sheet, the method comprising:
preparing a base sheet;
applying a roller to a first surface of the base sheet, the roller including:
a plurality of pressurization portions protruding from an outer surface of the roller,
a first plurality of recesses disposed at the plurality of pressurizing portions,
a plurality of decompression portions disposed on the outer surface of the roller, and a second plurality of recesses disposed at the plurality of decompression portions;

pressing the first surface of the base sheet using the roller;

forming, using the roller, a plurality of peaks and a plurality of valleys on the first surface of the base sheet;

forming diffusion patterns at the plurality of peaks and the plurality of valleys, wherein a diffusion pattern of the diffusion patterns is formed at a valley of the plurality of valleys; and curing the base sheet.

15. The method of claim 14, wherein the diffusion patterns are formed according to a predetermined interval.

16. The method of claim 14, wherein the first plurality of recesses and the second plurality of recesses are formed by using a laser.

17. The method of claim 14, wherein the base sheet is cured by ultraviolet rays.

18. The method of claim 14, further comprising forming a reflection pattern on a second surface opposite to the first surface.

19. The method of claim 14, wherein the diffusion patterns include a first plurality of diffusion patterns disposed at the plurality of peaks, and the diffusion patterns further include a second plurality of diffusion patterns disposed at the plurality of valleys.

20. The Method of claim 19, wherein each diffusion pattern of the first plurality of diffusion patterns has a diameter that is greater than or equal to about 5 micrometers and is less than or equal to about 50 micrometers.

* * * * *